(12) United States Patent
Asano et al.

(10) Patent No.: US 11,044,378 B2
(45) Date of Patent: Jun. 22, 2021

(54) OPTICAL DEVICE, IMAGE READING DEVICE, AND IMAGING FORMING APPARATUS

(71) Applicant: FUJI XEROX CO., LTD., Tokyo (JP)

(72) Inventors: Motohiro Asano, Kanagawa (JP); Masaki Hachisuga, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/808,933

(22) Filed: Mar. 4, 2020

(65) Prior Publication Data

US 2021/0029265 A1 Jan. 28, 2021

(30) Foreign Application Priority Data

Jul. 23, 2019 (JP) .............................. JP2019-134950

(51) Int. Cl.
*H04N 1/195* (2006.01)
*H04N 1/00* (2006.01)
*G02B 3/00* (2006.01)
*G02B 27/00* (2006.01)
*G03G 15/22* (2006.01)

(52) U.S. Cl.
CPC ....... *H04N 1/19589* (2013.01); *G02B 3/0062* (2013.01); *G02B 27/0006* (2013.01);
(Continued)

(58) Field of Classification Search
CPC ........... H04N 1/19589; H04N 1/00801; H04N 1/00013; H04N 1/00018; H04N 1/00092; H04N 1/00519–00679; H04N 1/00681–00761; H04N 1/00785–00827; H04N 1/00835; H04N 1/00909; H04N 1/024–0318; H04N 1/04–207; H04N 2201/024–04798; H04N 9/3105; H04N 9/3141; H04N 9/3144; H04N 5/2254; H04N 5/22571–02481; H04N 1/0249; H04N 1/02855; H04N 2201/02458; H04N 2201/0247; H04N 2201/02483; H04N 2201/02485; H04N 5/23218; H04N 5/23293; H04N 5/232945; H04N 5/64; H04N 9/3155; H04N 1/036; G02B 27/0006; G02B 3/0062; G02B 27/0075; G03G 15/221; B41J 2/45; B41J 2/451;
(Continued)

(56) References Cited

U.S. PATENT DOCUMENTS 7,885,006 B2 2/2011 Yamamura
2009/0141362 A1* 6/2009 Shimmo .............. H04N 1/0311
359/622
(Continued)

FOREIGN PATENT DOCUMENTS

JP 2000-295445 A 10/2000
JP 2010-204208 A 9/2010

*Primary Examiner* — Negussie Worku
(74) *Attorney, Agent, or Firm* — Oliff PLC

(57) ABSTRACT

An optical device includes: a lens body having multiple lenses arranged such that optical axes thereof are parallel to one another; a light-shielding wall that is disposed for the lens body and blocks, in an optical axis direction, portion of light directed to the multiple lenses; and a sheet member that covers a surface of the light-shielding wall, the surface being perpendicular to the optical axes, and allows light to pass therethrough.

20 Claims, 13 Drawing Sheets

(52) U.S. Cl.
CPC ....... *G02B 27/0075* (2013.01); *G03G 15/221* (2013.01); *H04N 1/00801* (2013.01)

(58) Field of Classification Search
CPC ........ F21V 11/183; F21V 17/02; F21V 17/14; G06K 9/00604; G06K 9/00617; G06K 9/00899
USPC ........................................................ 358/474
See application file for complete search history.

(56) References Cited

U.S. PATENT DOCUMENTS

| | | | |
|---|---|---|---|
| 2009/0294630 A1* | 12/2009 | Saito .................... | H04N 1/0318 250/208.1 |
| 2010/0157429 A1* | 6/2010 | Yamamura ......... | G02B 27/0018 359/622 |
| 2010/0172665 A1* | 7/2010 | Nomura ............... | G03G 15/326 399/51 |
| 2010/0172862 A1* | 7/2010 | Correia .................. | A61P 37/02 424/85.2 |
| 2013/0222862 A1* | 8/2013 | Sasaki ................ | H04N 1/02855 358/474 |
| 2017/0100534 A1* | 4/2017 | Fukikoshi .............. | A61M 5/007 |
| 2018/0088256 A1* | 3/2018 | Yamamura ....... | G03G 15/04054 |
| 2018/0313982 A1* | 11/2018 | Bando ................ | H01L 27/14685 |
| 2019/0052768 A1* | 2/2019 | Shiraishi ............. | H04N 1/1039 |
| 2019/0354035 A1* | 11/2019 | Shiraishi ............ | H04N 1/02815 |
| 2020/0106911 A1* | 4/2020 | Shiraishi ................ | G03G 15/22 |
| 2020/0324991 A1* | 10/2020 | Nakamura ............... | B65H 7/14 |

\* cited by examiner

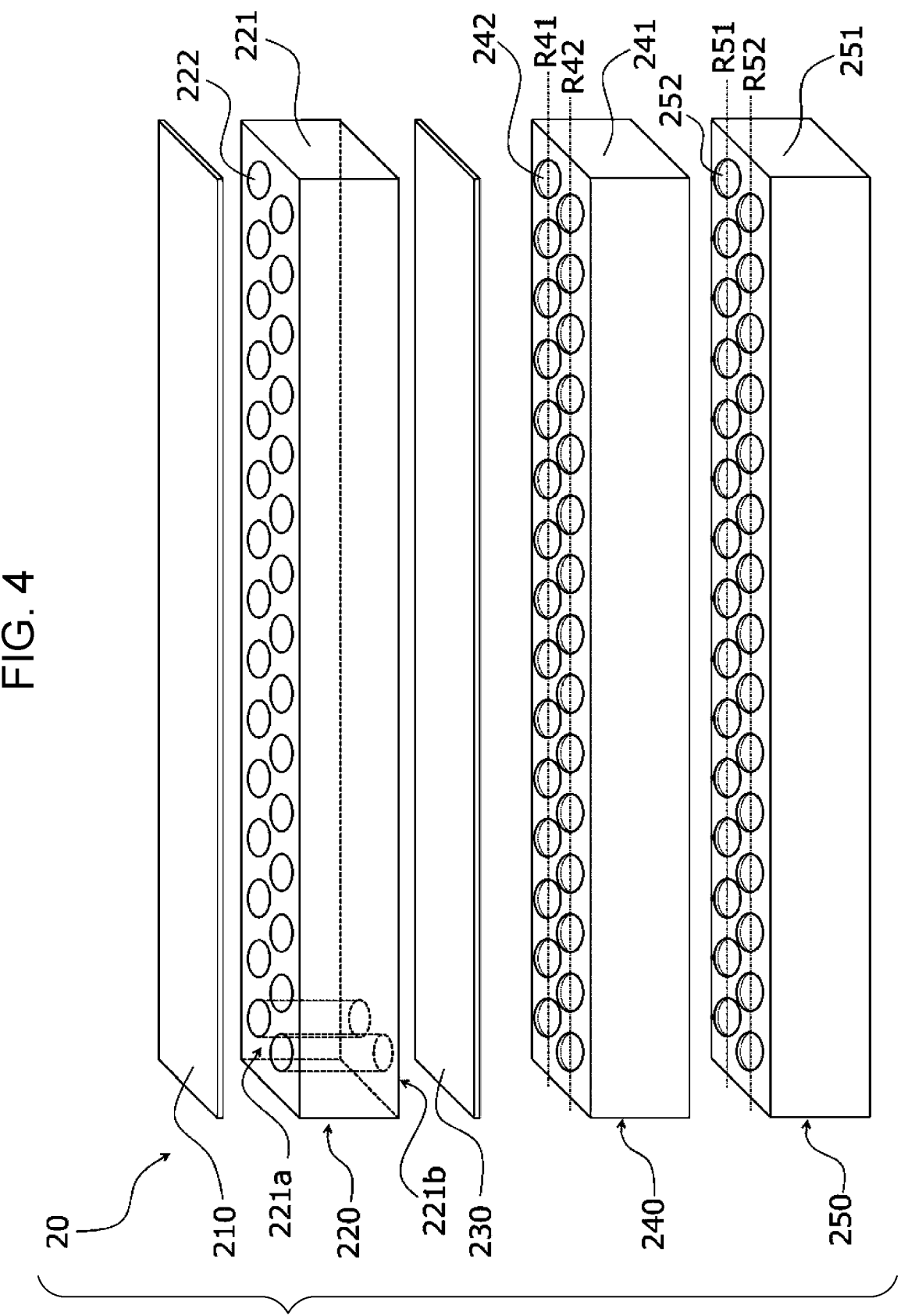

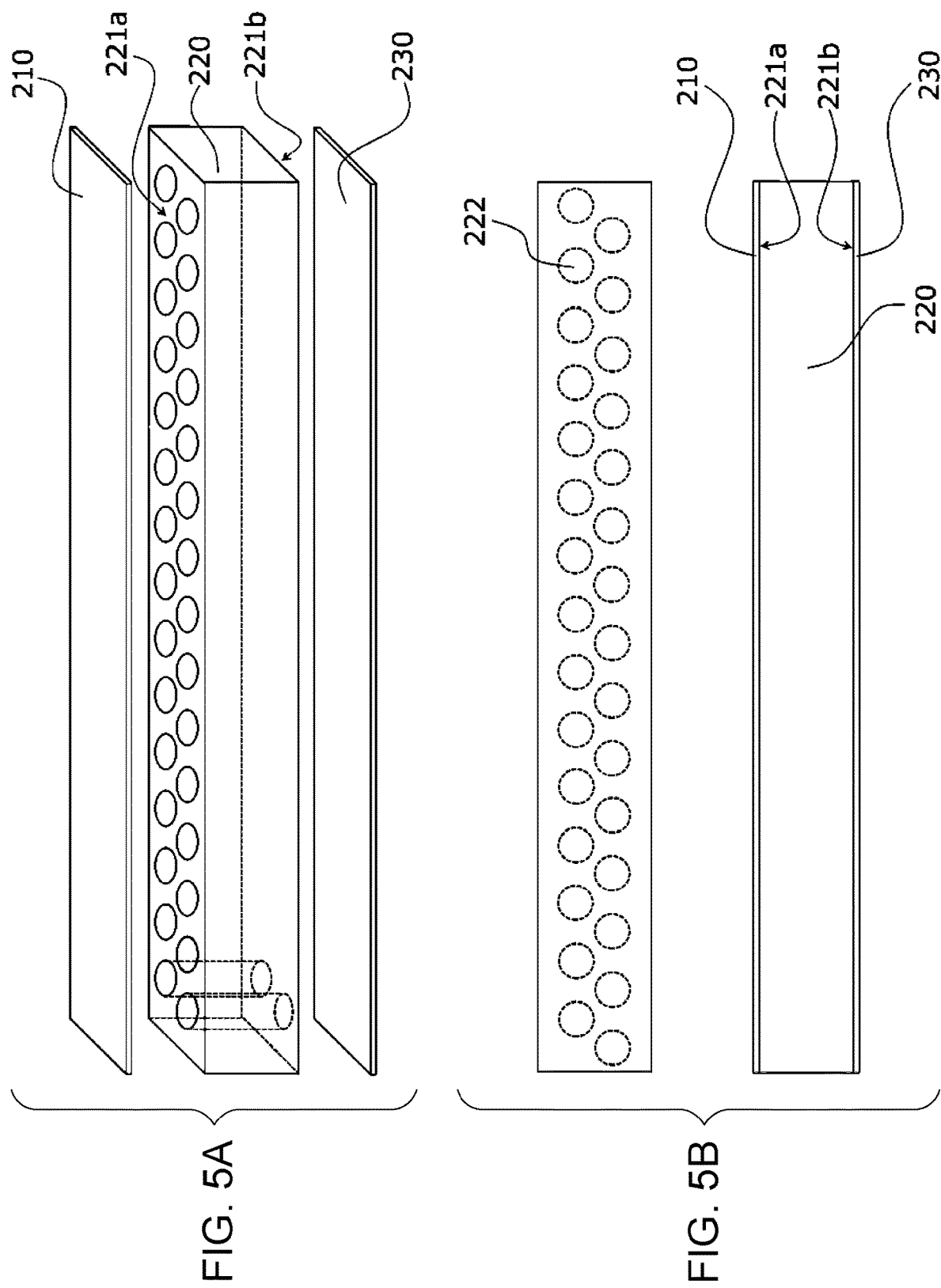

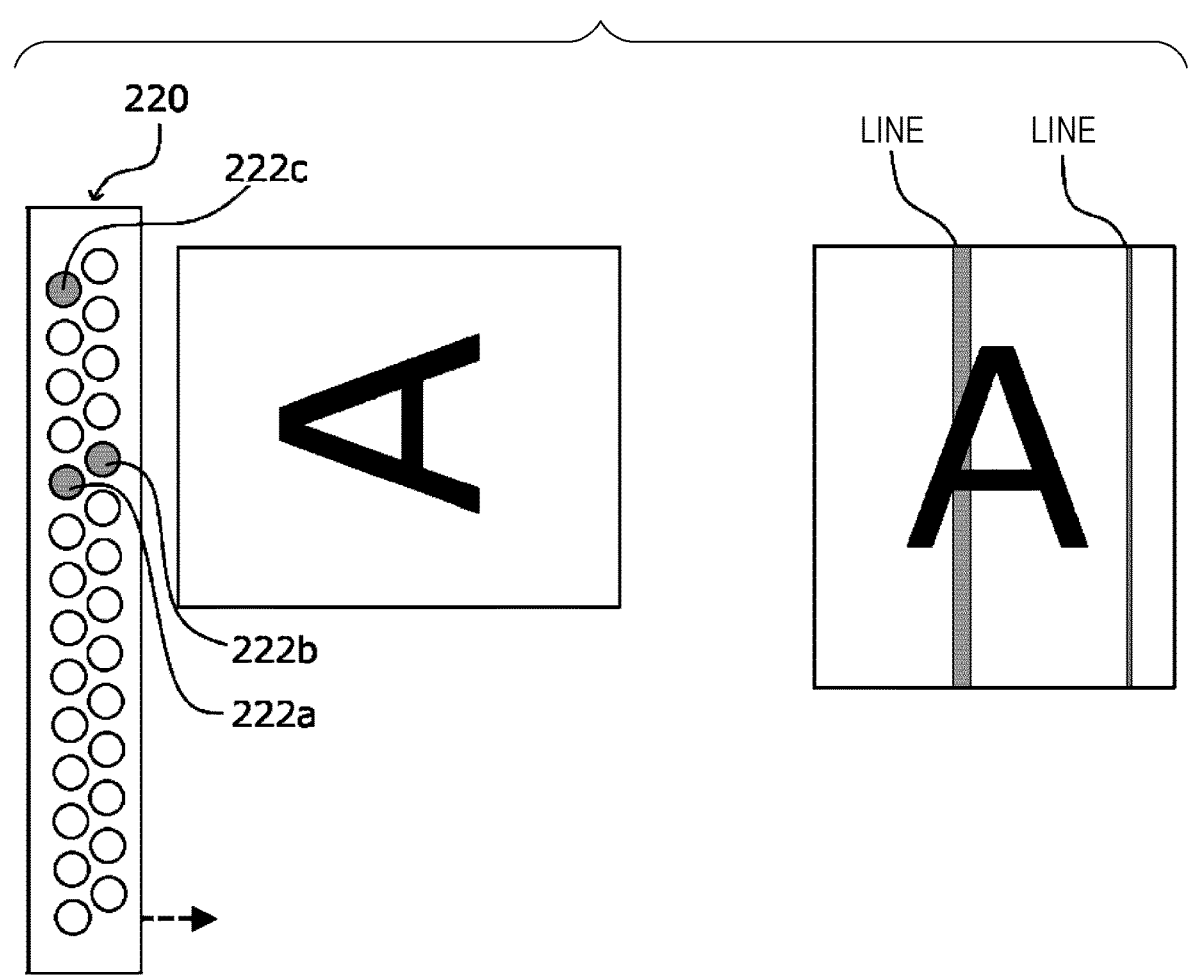

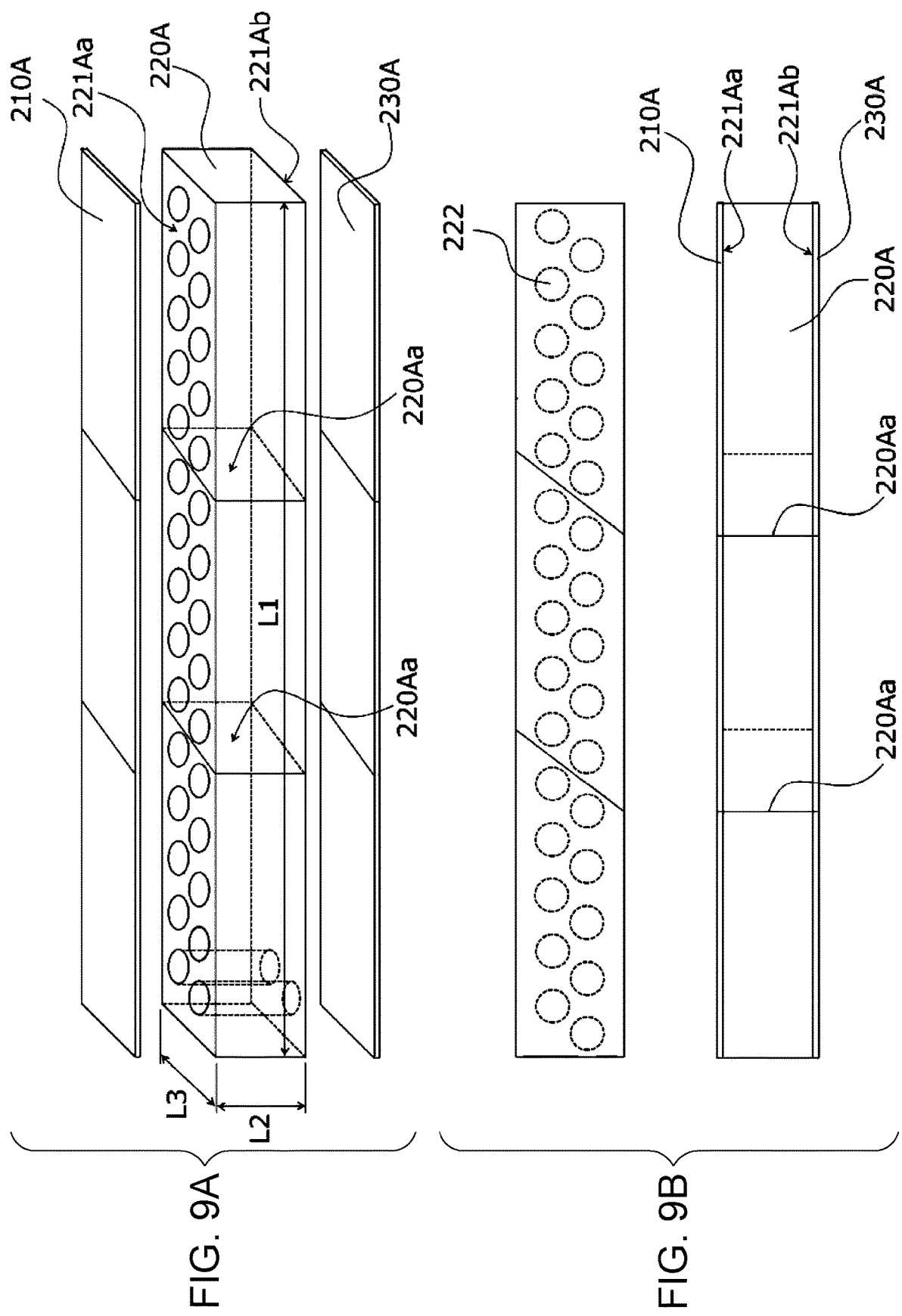

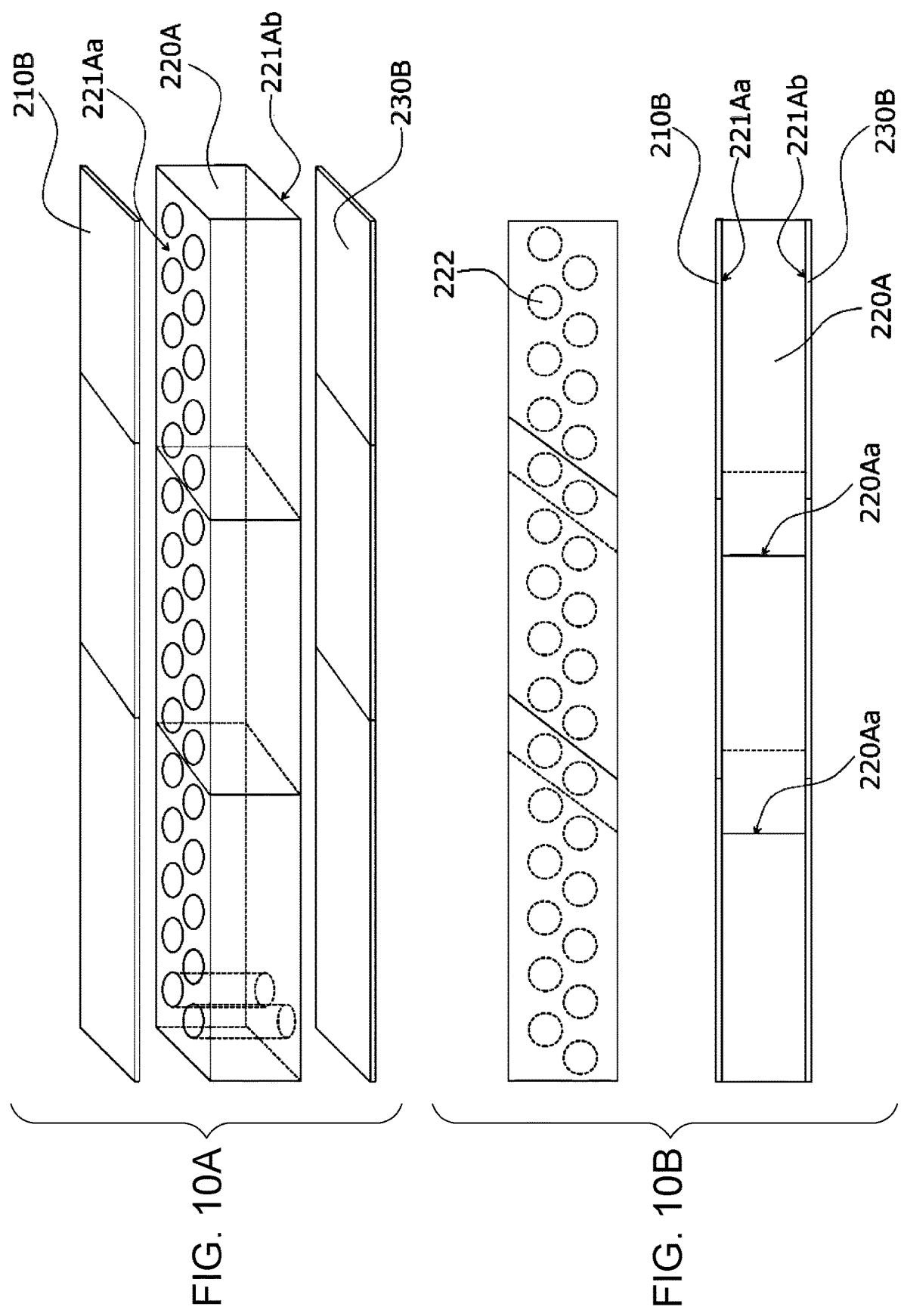

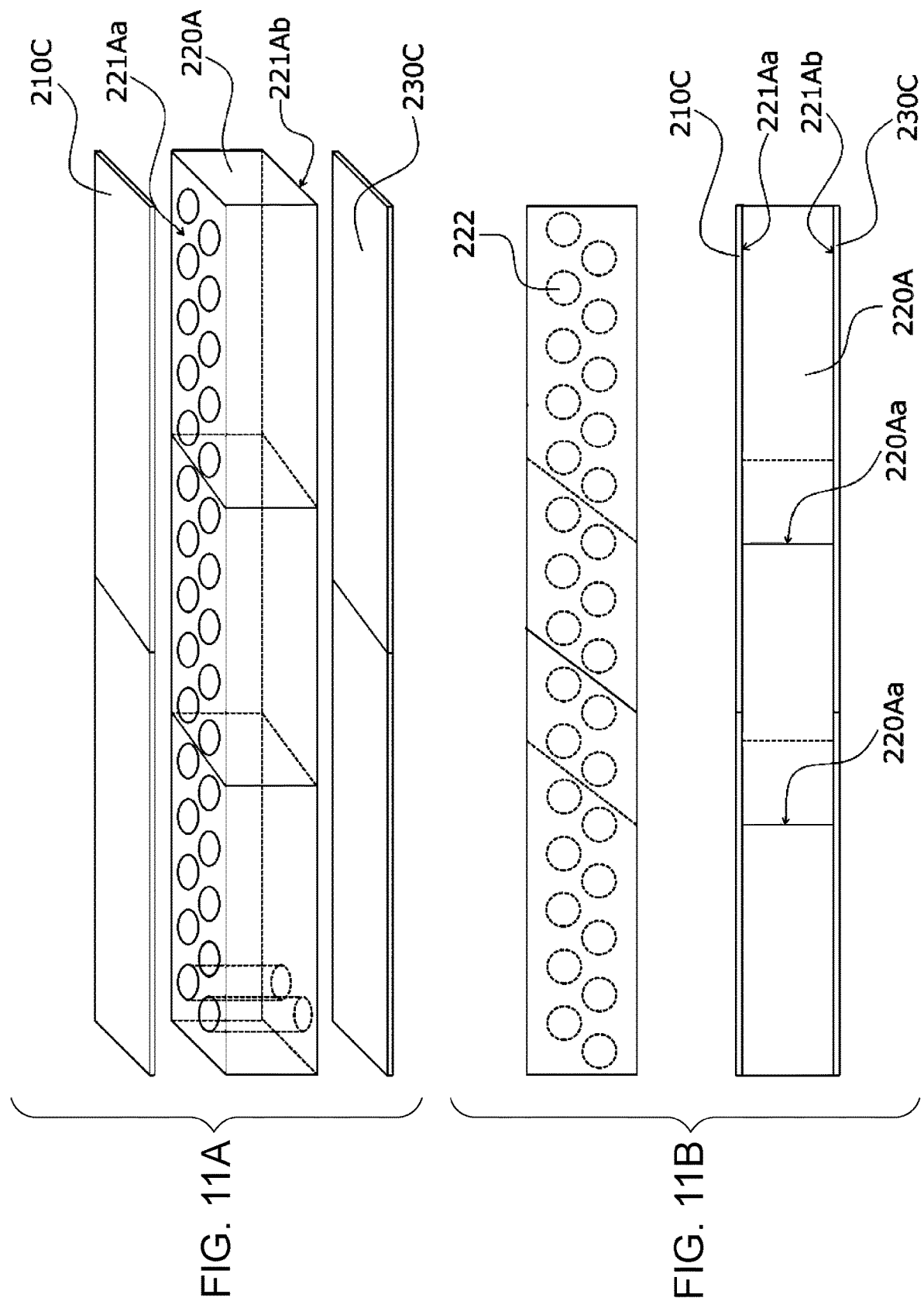

OPTICAL DEVICE, IMAGE READING DEVICE, AND IMAGING FORMING APPARATUS

CROSS-REFERENCE TO RELATED APPLICATIONS

This application is based on and claims priority under 35 USC 119 from Japanese Patent Application No. 2019-134950 filed Jul. 23, 2019.

BACKGROUND

(i) Technical Field

The present disclosure relates to an optical device, an image reading device, and an image forming apparatus.

(ii) Related Art

Japanese Unexamined Patent Application Publication No. 2000-295445 discloses a lens-array assembly that includes multiple lens arrays, in which multiple lens portions with convex or concave refracting surfaces and a holder portion connecting the multiple lens portions are integrally formed of a synthetic resin. The multiple lens arrays are stacked such that the optical axes of the lens portions are aligned, and the multiple lens portions in each lens array are arranged in multiple rows extending in the same direction.

Japanese Unexamined Patent Application Publication No. 2010-204208 discloses a lens unit including: lens arrays in which lens pairs, each including a first lens for forming a reduced inverted image of an object and a second lens for forming a magnified inverted image of the image formed by the first lens, are arranged substantially linearly in multiple rows; and a first light-shielding member having first irises between the first lenses and the second lenses. A second light-shielding member having second irises that are arranged substantially linearly at the same intervals as the lens pairs and in which the shape of the opening varies with the position in the optical axis direction of the lens pairs is provided. The second light-shielding member is disposed at at least one of the position between the first lens and the object plane and the position between the second lens and the image forming plane.

SUMMARY

Aspects of non-limiting embodiments of the present disclosure relate to suppressing deformation of a light-shielding wall in the optical axis direction of light passing through the light-shielding wall and to prevent entrance of foreign matter, compared with a configuration in which the light-shielding wall is not reinforced by a sheet member.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an optical device including: a lens body having a plurality of lenses arranged such that optical axes thereof are parallel to one another; a light-shielding wall that is disposed for the lens body and blocks, in an optical axis direction, portion of light directed to the plurality of lenses; and a sheet member that covers a surface of the light-shielding wall, the surface being perpendicular to the optical axes, and allows light to pass therethrough.

BRIEF DESCRIPTION OF THE DRAWINGS

Exemplary embodiment of the present disclosure will be described in detail based on the following figures, wherein:

FIG. 4 is an exploded perspective view of a lens array unit;

FIG. 5A is an exploded perspective view of a light-shielding wall to which a first reinforcement film and a second reinforcement film are bonded, and FIG. 5B shows the light-shielding wall to which the first reinforcement film and the second reinforcement film are bonded;

FIG. 9A is an exploded perspective view of a light-shielding wall to which a first reinforcement film and a second reinforcement film according to Modification 2 are bonded, and FIG. 9B shows the light-shielding wall to which the first reinforcement film and the second reinforcement film are bonded;

FIG. 10A is an exploded perspective view of a light-shielding wall to which a first reinforcement film and a second reinforcement film according to Modification 3 are bonded, and FIG. 10B shows the light-shielding wall to which the first reinforcement film and the second reinforcement film are bonded; and FIG. 11A is an exploded perspective view of a light-shielding wall to which a first reinforcement film and a second reinforcement film, each divided into two, are bonded, and FIG. 11B shows the light-shielding wall to which the first reinforcement film and the second reinforcement film divided into two are bonded.

DETAILED DESCRIPTION

Figure 1:
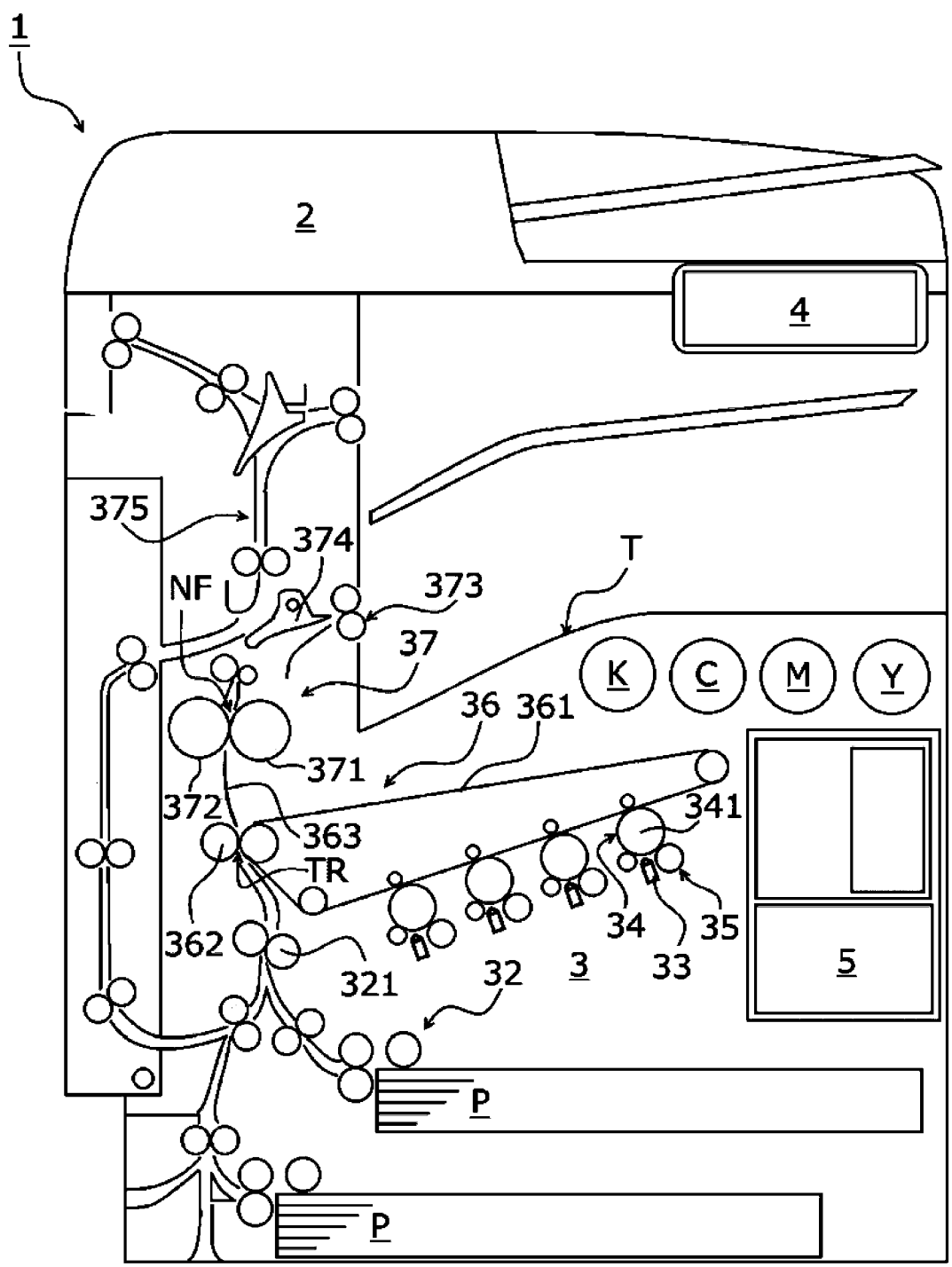
FIG. 1 is a schematic sectional view showing the internal configuration of an image forming apparatus.

Now, referring to the drawings, the present disclosure will be described in more detail below by means of exemplary embodiments and examples. However, the present disclosure is not limited to such exemplary embodiment and examples.

Furthermore, it should be noted that, in the description below given with reference to the drawings, the drawings are schematic, and the ratios etc. of the dimensions are different from the actual ones. For ease of understanding, components other than the members necessary for explanation are omitted from illustration where appropriate.

(1) Overall Configuration and Operation of Image Forming Apparatus

Figure 2:
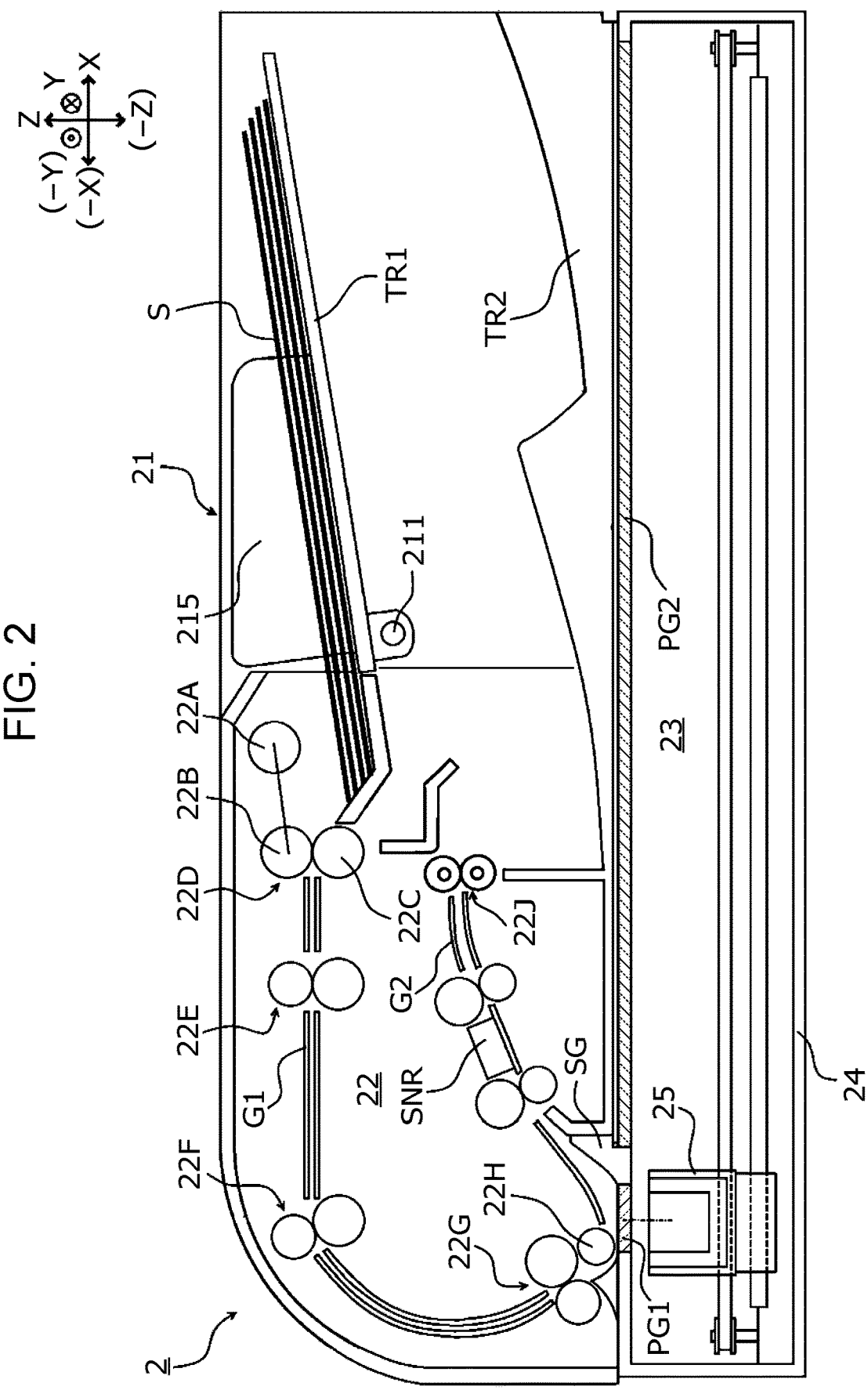
FIG. 2 is a sectional view showing the internal configuration of an image reading device.
Figure 3:
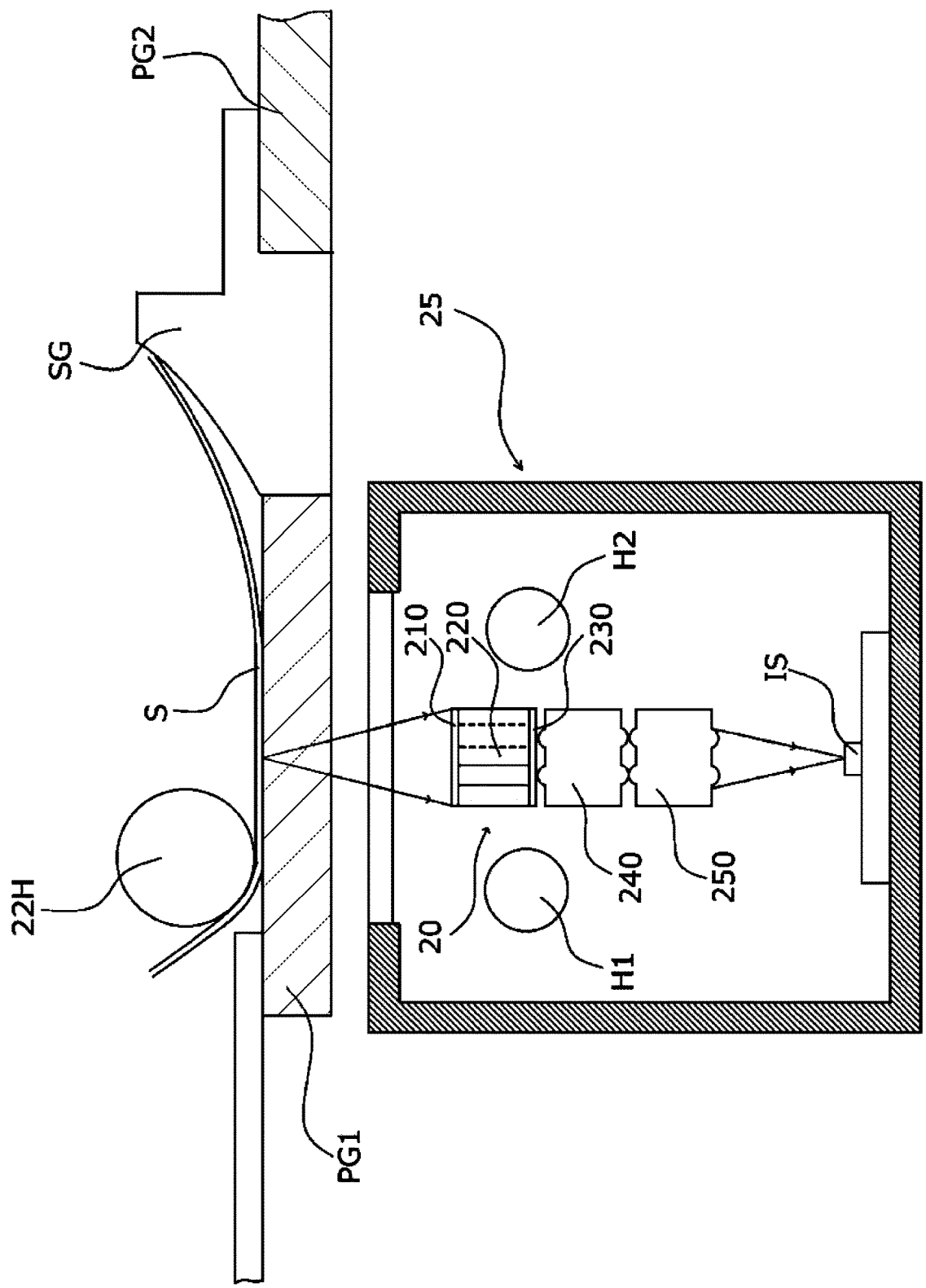
FIG. 3 is a schematic sectional view of an image reading unit of the image reading device.

FIG. 1 is a schematic sectional view showing the internal configuration of an image forming apparatus 1 according to this exemplary embodiment, FIG. 2 is a sectional view showing the internal configuration of an image reading device 2, and FIG. 3 is a schematic sectional view of an image reading unit of the image reading device 2. The overall configuration and operation of the image forming apparatus 1 will be described below with reference to the drawings.

(1.1) Overall Configuration

The image forming apparatus 1 includes: the image reading device 2 that reads an image from a sheet S, such as an original document, and converts the image into image data; an image forming unit 3, serving as an image recording part, which prints the read image data on a sheet, serving as a recording medium; an operation information unit 4, serving as a user interface; and an image processing unit 5.

The image reading device 2 includes a sheet loading part 21, an automatic sheet feeder 22, and an image reading unit 23. The automatic sheet feeder 22 transports a sheet S on the sheet loading part 21 to the reading position in the image reading unit 23. The image read by an image sensor IS, such as a charge-coupled device (CCD) line sensor, of the image reading unit 23 is converted into image data, which is an electric signal.

The image forming unit 3 includes a sheet feed device 32, exposure devices 33, photoconductor units 34, developing devices 35, a transfer device 36, and a fixing device 37 and forms a toner image of the image information received from the image processing unit 5 on a sheet P fed from the sheet feed device 32.

The operation information unit 4, serving as a user interface, is provided on the front side of the image reading device 2. The operation information unit 4 includes a liquid-crystal display panel, various operation buttons, a touch screen, etc. A user of the image forming apparatus 1 inputs various settings and instructions through the operation information unit 4. Furthermore, the liquid-crystal display panel displays various information for the user of the image forming apparatus 1.

The image processing unit 5 generates image data from the image read by the image reading device 2 and the print information transmitted from an external device (for example, a personal computer or the like).

(1.2) Image Forming Unit

A sheet P specified by a print job for each printing is fed from the sheet feed device 32 to the image forming unit 3 in accordance with image-forming timing.

The photoconductor units 34 are disposed in parallel above the sheet feed device 32 and include rotationally driving photoconductor drums 341. The exposure devices 33 form electrostatic latent images on the photoconductor drums 341, and the developing devices 35 form yellow (Y), magenta (M), cyan (C), and black (K) toner images thereon.

The color toner images formed on the photoconductor drums 341 of the photoconductor units 34 are sequentially and electrostatically transferred (first-transferred) to an intermediate transfer belt 361 of the transfer device 36, thus forming a superimposed toner image, in which color toners are superimposed on one another. The superimposed toner image on the intermediate transfer belt 361 is transferred to the sheet P, fed by a registration roller pair 321 and guided by a transport guide, by a second transfer roller 362.

In the fixing device 37, a fixing nip NF (fixing area) is formed by a heating module 371 and a pressure module 372, which form a pair and are pressed against each other.

The sheet P, to which the superimposed toner image is transferred by the transfer device 36, is transported, via a transport guide 363, to the fixing nip NF of the fixing device 37 with the toner image being unfixed. Then, the toner image is fixed to the sheet P by the effect of heat and pressure applied by the heating module 371 and the pressure module 372.

The sheet P having the toner image fixed thereto is guided to a switching gate 374 and is discharged on and accommodated in a sheet output tray T provided on the top surface of the image forming apparatus 1 via a first discharging roller pair 373. Furthermore, when the sheet P is reversed for duplex printing or is discharged with the image recording side facing up, the transport direction is switched toward a transport path 375 at the switching gate 374.

(1.3) Image Reading Device

The sheet loading part 21 includes a sheet tray TR1, on which a sheet S having an image thereon is disposed.

The automatic sheet feeder 22 includes a nudger roller 22A that sequentially picks sheets S on the sheet tray TR1 from the top, and a separating part 22D including a feed roller 22B and a retard roller 22C.

In the separating part 22D, when multiple sheets S are fed together to the nip part N, the feed roller 22B and the retard roller 22C, forming a pair, separate the sheets S and transport the sheets S one-by-one to the image reading unit 23.

In a sheet transport path G1, a take-away roller 22E is disposed downstream of the feed roller 22B in the sheet transport direction. The take-away roller 22E transports the sheet S fed by the feed roller 22B to a pre-registration roller 22F.

A registration roller 22G that controls the sheet transport timing is disposed downstream of the pre-registration roller 22F. The pre-registration roller 22F brings the leading end of the sheet S into contact with the stopped registration roller 22G, thus forming a loop, to correct a skew. The registration roller 22G is rotationally driven in accordance with the reading-start timing, and the sheet S, held in a loop by the take-away roller 22E and the pre-registration roller 22F, is pressed against a reading glass PG1 by a platen roller 22H, so that the surface thereof is read by the image reading unit 23.

The sheet S having passed through the reading glass PG1 is guided by a sheet guide SG and is transported to a reading sensor 232. The sheet S, whose surface has been read by the image reading unit 23, is transported through a sheet transport path G2, while the back surface thereof is read by a reading sensor SNR, and is discharged on a sheet output tray TR2 formed below the sheet loading part 21 by a discharging roller 22J.

In the image reading unit 23, a platen glass PG2, on which the sheet S is placed, is disposed at the top surface of a housing 24, and a carriage 25 that can reciprocate in a sub scanning direction (right-left direction: X direction) is provided in the housing 24.

The carriage 25 includes: a first lamp H1 and a second lamp H2, serving as examples of an illuminating part, which are light-emitting diode (LED) lamps and illuminate the sheet S passing through the reading glass PG1 or the sheet S on the platen glass PG2; a lens array unit 20, serving as an example of an optical device, which forms an image of reflected light from the sheet S with a predetermined magnification; and an image sensor (CMOS solid-state image device) IS. The image sensor IS is a reading sensor for reading the image on the sheet S and generates an analog image signal corresponding to the reflected light from the sheet S.

When the sheet S is placed on the platen glass PG2, the image information is read line-by-line while the carriage 25 is sequentially moved in the sub scanning direction (X direction). This way, the reflected light from the sheet S is guided to the image sensor IS to read the overall image of the sheet S.

(2) Lens Array Unit

FIG. 4 is an exploded perspective view of the lens array unit 20 according to this exemplary embodiment, FIG. 5A is an exploded perspective view of a light-shielding wall 220 to which a first reinforcement film 210 and a second reinforcement film 230 are bonded, and FIG. 5B shows the light-shielding wall 220 to which the first reinforcement film 210 and the second reinforcement film 230 are bonded. The lens array unit 20 will be described below with reference to the drawings.

As shown in FIG. 4, the lens array unit 20 includes: the first reinforcement film 210, serving as an example of a sheet member; the light-shielding wall 220; the second reinforcement film 230, serving as an example of the sheet member; a first lens array 240, serving as an example of a lens body; and a second lens array 250, serving as an example of the lens body.

In the lens array unit 20, the first reinforcement film 210 and the second reinforcement film 230 are bonded to opposing surfaces 221a and 221b of the light-shielding wall 220 so as to sandwich the light-shielding wall 220. Furthermore, the light-shielding wall 220, the first lens array 240, and the second lens array 250 are stacked in this order and are bonded together with an adhesive or the like.

(2.1) First Lens Array and Second Lens Array

The first lens array 240 and the second lens array 250 are a pair of substantially rectangular-parallelepiped-shaped lens members and have the same shape.

The first lens array 240 has a substantially rectangular-parallelepiped-shaped first support body 241 and multiple first lenses 242 formed on the front and back surfaces of the first support body 241. The multiple first lenses 242 are configured such that the optical axes thereof extend in the same direction. What is meant by "the optical axes of the multiple first lenses 242 extend in the same direction" is that each first lens 242 only needs to form, on the image sensor IS, an equal-magnification upright image of one line of image of the sheet S on the reading glass PG1 or the platen glass PG2. Hence, the optical axes of the multiple first lenses 242 do not necessarily have to be parallel to one another, but may be at angles to one another.

Furthermore, the multiple first lenses 242 are provided along a first row R41 and a second row R42 extending in the main scanning direction, in a staggered manner. More specifically, the first lenses 242 in the first row R41 and the first lenses 242 in the second row R42 are disposed at the predetermined same pitch so as to be shifted from one another in the main scanning direction.

The second lens array 250 has a substantially rectangular-parallelepiped-shaped second support body 251 and multiple second lenses 252 formed on the front and back surfaces of the second support body 251. The multiple second lenses 252 are configured such that the optical axes thereof extend in the same direction. What is meant by "the optical axes of the multiple second lenses 252 extend in the same direction" is that each second lens 252 only needs to form, on the image sensor IS, an equal-magnification upright image of one line of image of the sheet S on the reading glass PG1 or the platen glass PG2. Hence, the optical axes of the multiple second lenses 252 do not necessarily have to be parallel to one another, but may be at angles to one another.

Furthermore, the multiple second lenses 252 are provided along a first row R51 and a second row R52 extending in the main scanning direction, in a staggered manner. More specifically, the second lenses 252 in the first row R51 and the second lenses 252 in the second row R52 are disposed at the predetermined same pitch so as to be shifted from one another in the main scanning direction.

The thus-configured first lens array 240 and the second lens array 250 are disposed such that the optical axes of the first lenses 242 and the optical axes of the second lenses 252 are aligned. Furthermore, the first lens array 240 and the second lens array 250 are each formed of, for example, an optically transparent optical resin as a single component by injection molding.

(2.2) Light-Shielding Wall

As shown in FIG. 4, the light-shielding wall 220 has a substantially rectangular-parallelepiped-shaped body 221 and multiple optical-axis holes 222 penetrating from the front surface 221a to the back surface 221b of the body 221 and is disposed such that the longitudinal direction thereof is parallel to the main scanning direction.

In this exemplary embodiment, the multiple optical-axis holes 222 have a diameter of 0.5 mm and are disposed at predetermined intervals in the main scanning direction. The multiple optical-axis holes 222 are disposed such that the optical axes of the first lenses 242 can pass therethrough. More specifically, the intervals of the optical-axis holes 222 in the light-shielding wall 220 in the main scanning direction are equal to the intervals of the first lenses 242 in the first lens array 240 and the intervals of the second lenses 252 in the second lens array 250.

The thus-configured light-shielding wall 220 is formed of, for example, a resin material (for example, acrylonitrile-butadiene-styrene (ABS) or a polycarbonate (PC)) mixed with a black colorant and blocks light that does not contribute to image formation with the first lenses 242 and the second lenses 252.

Specifically, in the light-shielding wall 220, the area of the body 221 with no optical-axis holes 222 serves as a wall that blocks, in the main scanning direction, light between the first lenses 242 and blocks light entering the first lenses 242 and the second lenses 252 in directions intersecting the optical axes, that is, light entering at angles. This reduces the light entering from one lens of the first lenses 242 and the second lenses 252 into a lens adjacent thereto in the main scanning direction.

This reduces the angles of view of the first lenses 242 and the second lenses 252, increasing the depth of focus. Furthermore, it is possible to reduce the stray light in the light passing through the first lenses 242 and the second lenses 252.

Herein, the angle of view is the visual angle of the ray with respect to the optical axis direction (i.e., the angle formed between the ray and the normal). Furthermore, the stray light is the light emitted from an object point on the object plane and reaching a point other than the corresponding image point on the image plane.

Furthermore, the light-shielding wall 220 is formed of a resin material mixed with a black colorant, and the inner surfaces of the optical-axis holes 222 are black. The black surfaces of the optical-axis holes 222 inhibit the light blocked by the body 221 from being reflected at the optical-axis holes 222.

(2.3) First Reinforcement Film and Second Reinforcement Film

The first reinforcement film 210 and the second reinforcement film 230 are elongated thin plates and have the same shape in this exemplary embodiment.

The first reinforcement film 210 and the second reinforcement film 230 have a smaller thickness (i.e., the dimension in the optical axis direction) than the light-shielding wall 220. More specifically, the first reinforcement film 210 and the second reinforcement film 230 are transparent resin films having a thickness of less than 0.5 mm. The first reinforcement film 210 may be a transparent glass plate having a thickness of less than 0.1 mm, instead of the resin film. This increases the strength of the light-shielding wall 220 in the optical axis direction, while suppressing refraction of the light entering the light-shielding wall 220.

As shown in FIG. 5, the thus-configured first reinforcement film 210 and second reinforcement film 230, which have the same shape and extend in the longitudinal direction intersecting the optical axis direction of the light-shielding wall 220, are bonded to the front surface 221a and the back surface 221b of the body 221, which are the top and bottom surfaces of the light-shielding wall 220 facing each other, so as to sandwich the light-shielding wall 220. This suppresses deformation of the light-shielding wall 220 in the optical axis direction, thus making it easy to dispose the light-shielding wall 220 on the first lens array 240. This also suppresses variation in the optical-axis-direction-length of the light-shielding wall 220 in the longitudinal direction.

(2.4) Effect of First Reinforcement Film and Second Reinforcement Film

Figure 6A:
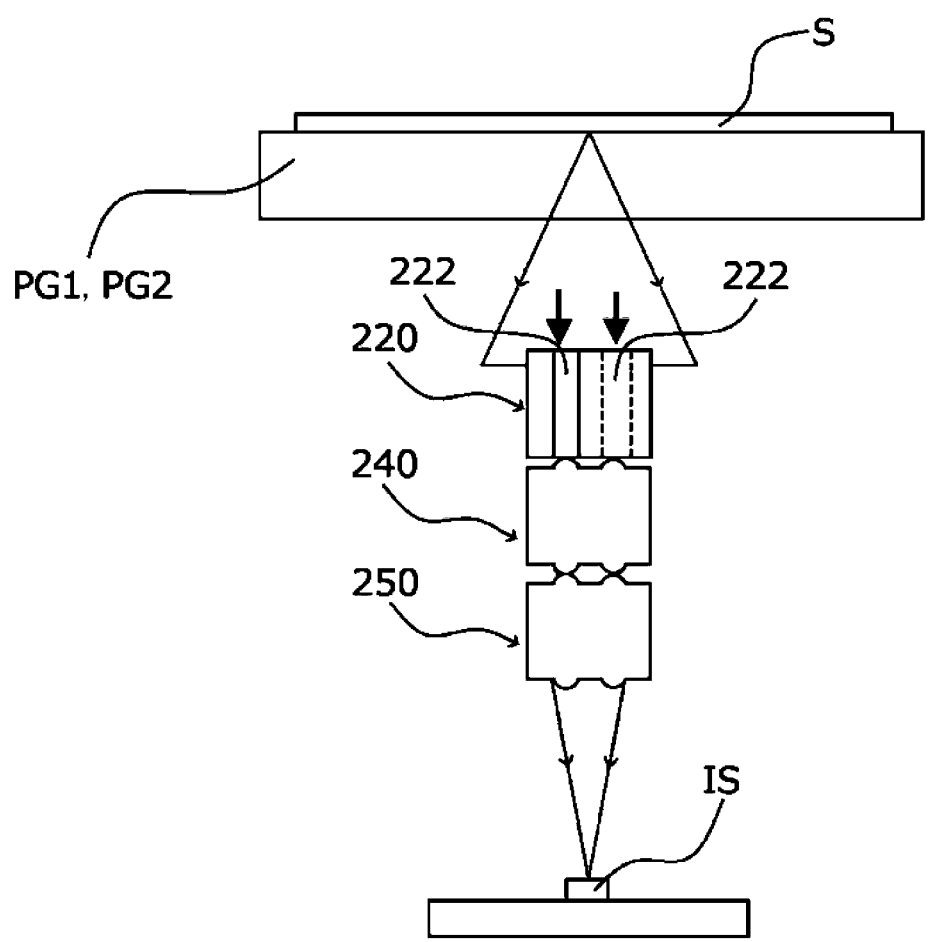
FIG. 6A schematically shows a state in which original-document light forms an image on an image sensor through a lens array unit having no reinforcement film, and FIG. 6B schematically shows an image reading state when foreign matter is in optical-axis holes in the light-shielding wall.
Figure 7A:
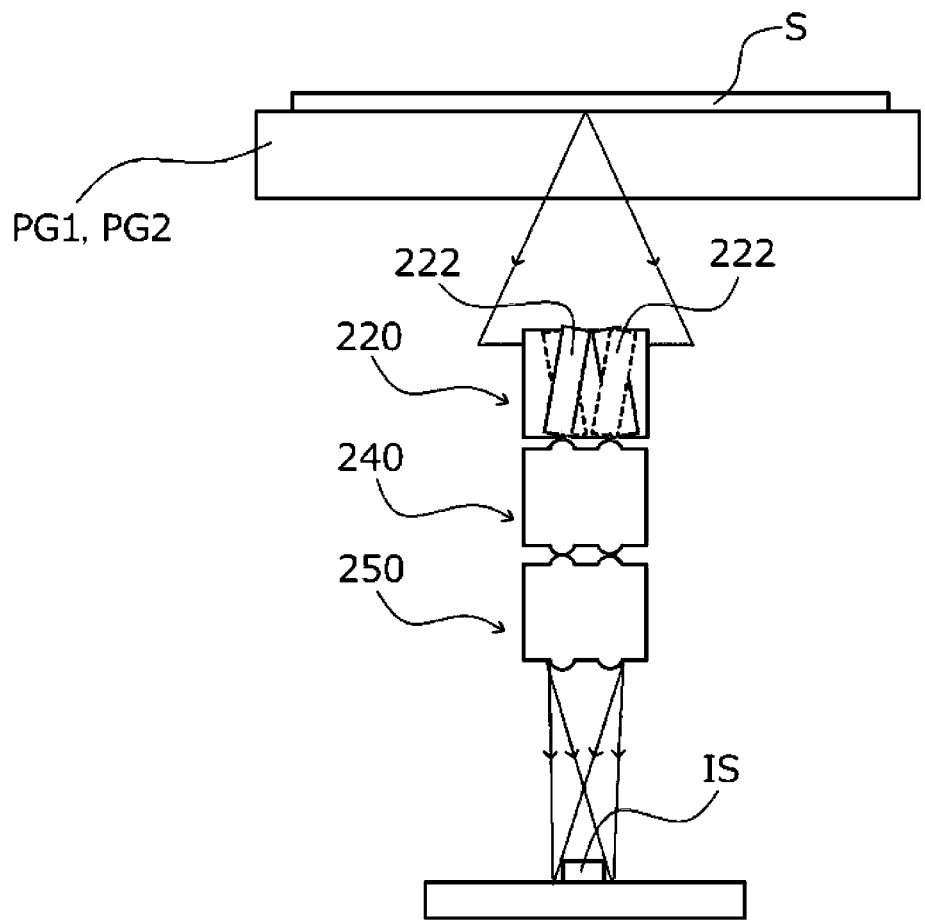
FIG. 7A schematically shows a state in which original-document light forms an image on the image sensor through a lens array unit with a tilted light-shielding wall.

FIG. 6A schematically shows a state in which original-document light forms an image on the image sensor IS through a lens array unit 20 having no reinforcement film, and FIG. 6B schematically shows an image reading state when foreign matter is in the optical-axis holes 222 in the light-shielding wall 220. FIG. 7A schematically shows a state in which original-document light forms an image on the image sensor IS through a lens array unit with a tilted light-shielding wall 220, and FIG. 7B shows the intensities of image-forming light and stray light on the image sensor.

As shown in FIG. 6A, the optical-axis holes 222 in the light-shielding wall 220 are open at the top, allowing the original-document light coming from the reading glass PG1 or the platen glass PG2 to pass therethrough. Thus, foreign matter, such as dust and paper dust, can enter and accumulate in the optical-axis holes 222. If foreign matter is deposited in the optical-axis holes 222, more specifically, for example, if foreign matter is deposited in the optical-axis holes 222a, 222b, and 222c (indicated with dots) in FIG. 6B, the original-document light passing through the optical-axis holes 222a, 222b, and 222c in the light-shielding wall 220 is blocked, potentially causing longitudinal lines in the read image.

If the light-shielding wall 220 is tilted as shown in FIG. 7A, the original-document light entering the first lenses 242 is uneven, potentially decreasing the intensity of overall light reaching the image sensor IS and increasing stray light. FIG. 7B schematically shows the light intensities on the image sensor IS when the optical-axis holes 222 in the light-shielding wall 220 are misaligned, shifting (A-A in FIG. 7B) the light entering the first lenses 242 of the first row R41 from the central position (C-C in FIG. 7B).

Figure 7B:
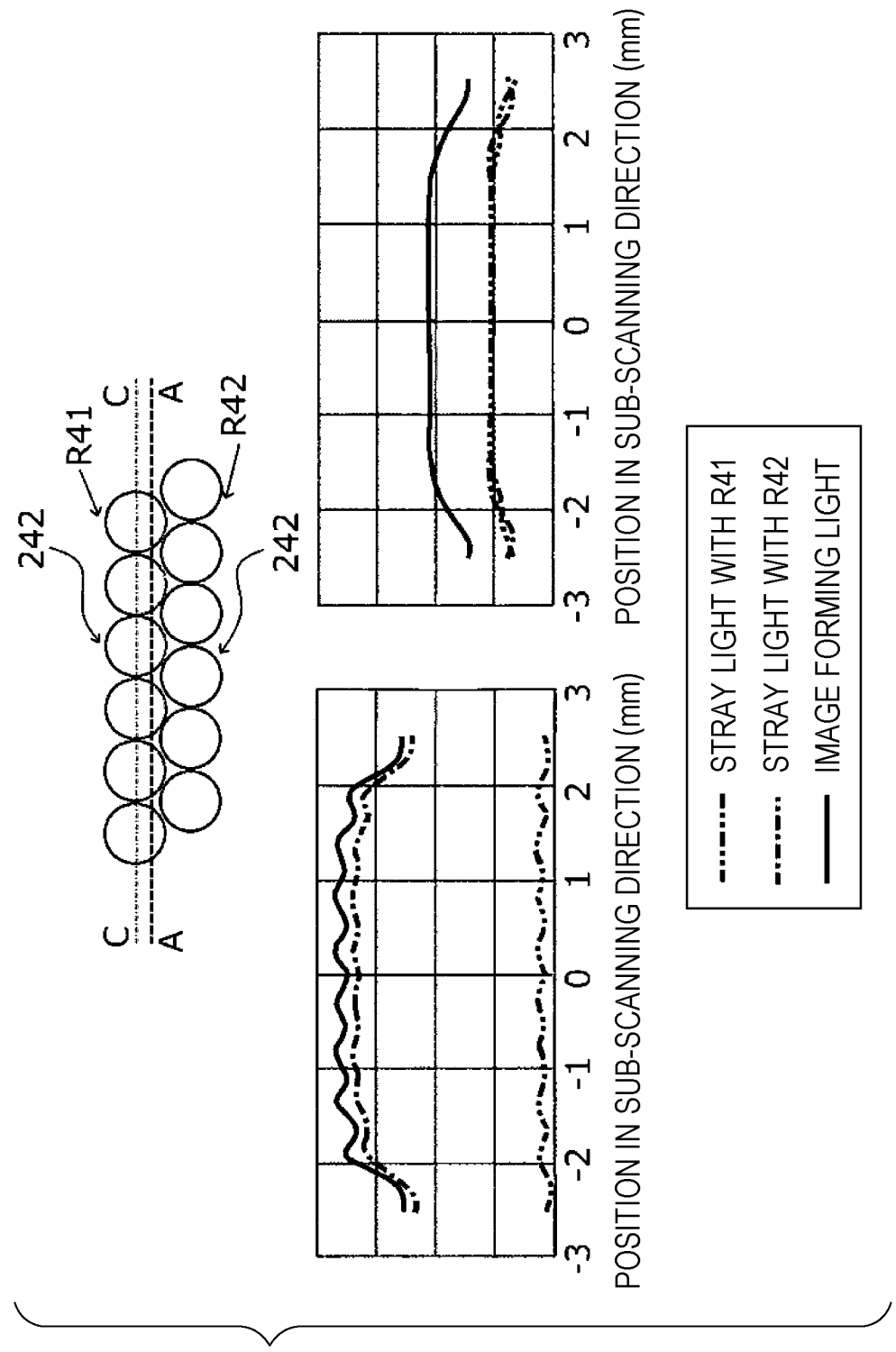
FIG. 7B shows the intensities of image-forming light and stray light on the image sensor.

As shown in FIG. 7B, when the optical-axis holes 222 are axially aligned, there is no difference between the stray light component produced by the first lenses 242 of the first row R41 and the stray light component produced by the first lenses 242 of the second row R42, and the light intensities thereof are different from the light intensity of the image-forming light. Meanwhile, when the optical-axis holes 222 are misaligned, the light intensity of the stray light component produced by the first lenses of the second row R42 is small, and the light intensity of the stray light component produced by the first lenses 242 of the first row R41 is large and is almost at the same level as the light intensity of the image-forming light. Furthermore, the non-uniformity of the stray light component among the lenses is large.

In the lens array unit 20 according to this exemplary embodiment, the first reinforcement film 210 and the second reinforcement film 230 are bonded, from above and below, to the front surface 221a and the back surface 221b of the light-shielding wall 220, facing each other, so as to sandwich the light-shielding wall 220. The first reinforcement film 210 and the second reinforcement film 230 are transparent resin films having a thickness of less than 0.5 mm or transparent glass plates having a thickness of less than 0.1 mm and increase the strength of the light-shielding wall 220 in the optical axis direction while suppressing refraction of light entering the optical-axis holes 222 in the light-shielding wall 220.

This configuration prevents entrance of foreign matter into the optical-axis holes 222 and suppresses tilting of the light-shielding wall 220, thus suppressing axial misalignment of the optical-axis holes 222.

Modification 1

Figure 8A:
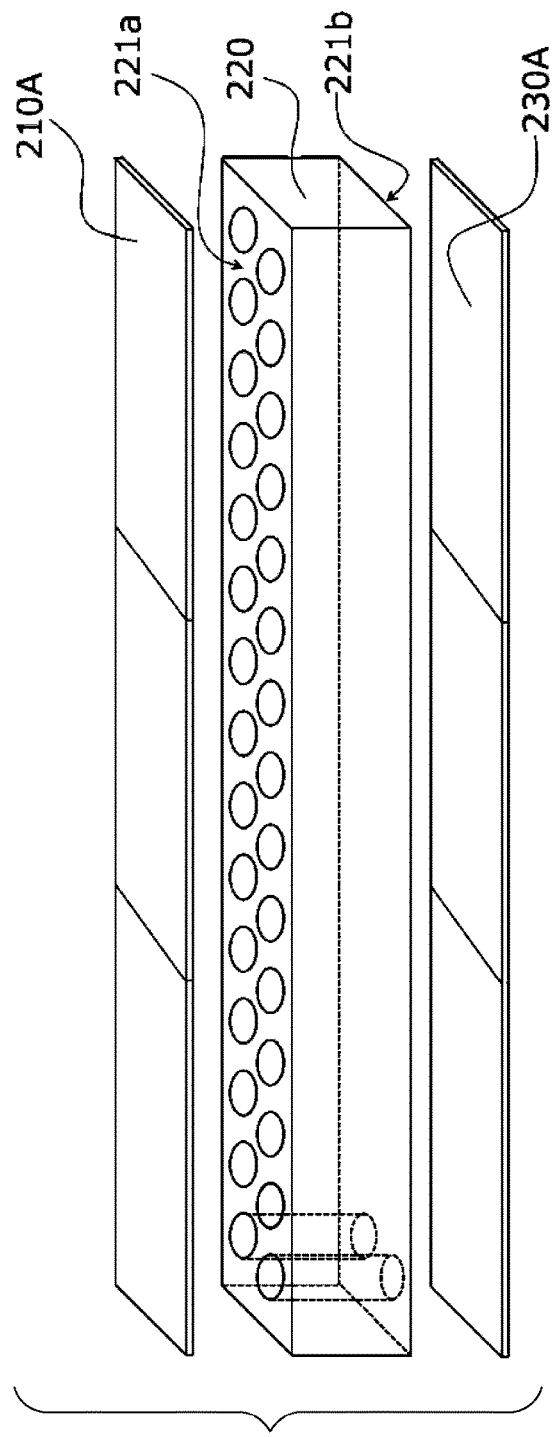
FIG. 8A is an exploded perspective view of a light-shielding wall to which a first reinforcement film and a second reinforcement film according to Modification 1 are bonded.
Figure 8B:
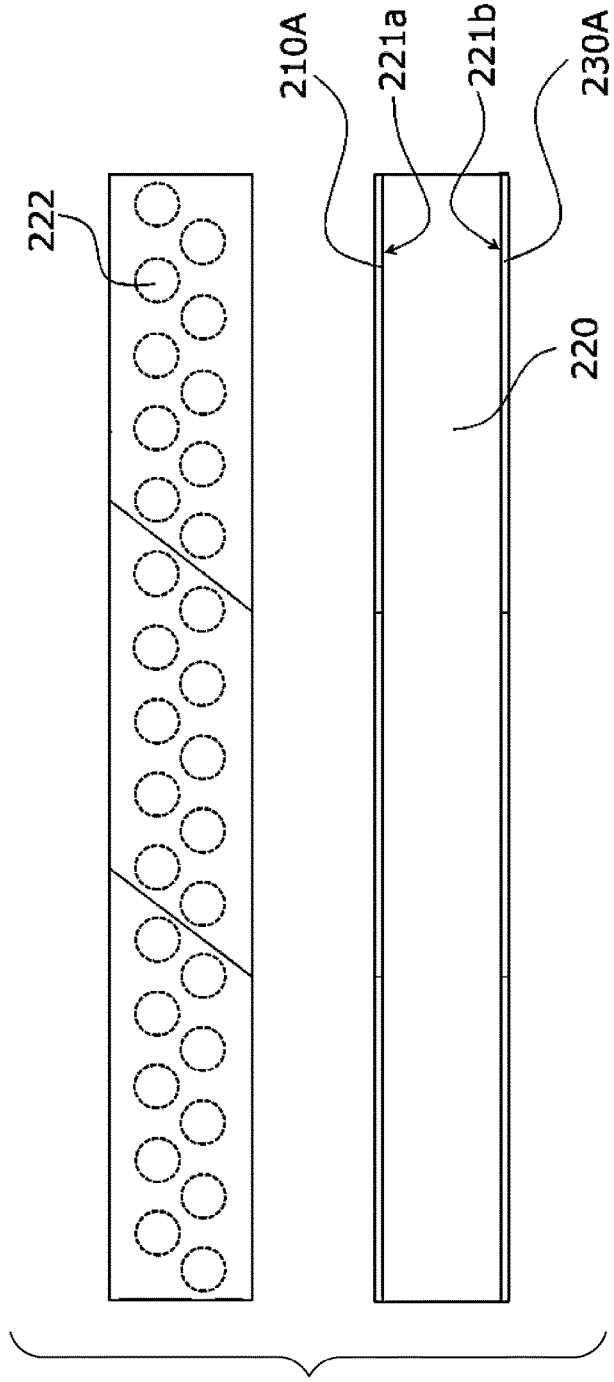
FIG. 8B shows the light-shielding wall to which the first reinforcement film and the second reinforcement film are bonded.

FIG. 8A is an exploded perspective view of a light-shielding wall 220 to which a first reinforcement film 210A and a second reinforcement film 230A according to Modification 1 are bonded, and FIG. 8B shows the light-shielding wall 220 to which the first reinforcement film 210A and the second reinforcement film 230A are bonded.

As shown in FIG. 8A, the first reinforcement film 210A and the second reinforcement film 230A according to Modification 1 are divided into multiple pieces in the longitudinal direction intersecting the optical axis direction of the optical-axis holes 222 in the light-shielding wall 220. In Modification 1, the first reinforcement film 210A and the second reinforcement film 230A are each divided into three pieces and have the same shape. The number of pieces may be more than three.

The divided first reinforcement film 210A and second reinforcement film 230A are transparent resin films having a thickness of less than 0.5 mm or transparent glass plates having a thickness of less than 0.1 mm.

As shown in FIG. 8B, the thus-divided first reinforcement film 210A and the second reinforcement film 230A are bonded, from above and below, to the front surface 221a and the back surface 221b of the light-shielding wall 220, facing each other, so as to sandwich the light-shielding wall 220. This configuration suppresses deformation of the light-shielding wall 220 in the optical axis direction, thus making it easy to dispose the light-shielding wall 220 on the first lens array 240.

Modification 2

FIG. 9A is an exploded perspective view of a light-shielding wall 220A to which a first reinforcement film 210A and a second reinforcement film 230A according to Modification 2 are bonded, and FIG. 9B shows the light-shielding wall 220A to which the first reinforcement film 210A and the second reinforcement film 230A are bonded.

As shown in FIG. 9A, the light-shielding wall 220A according to Modification 2 is divided into multiple pieces in the longitudinal direction. The pieces are joined together at division surfaces 220Aa and are disposed on the first lens array 240.

In Modification 2, the light-shielding wall 220A has a length L1, in the longitudinal direction (main scanning direction), of 300 mm, a length L2, in the thickness direction (optical axis direction), of 6 mm, and a length L3, in the width direction (sub scanning direction), of 2 mm. When the light-shielding wall 220A is made of a resin material mixed with a black colorant by injection molding, by dividing the light-shielding wall 220A into multiple pieces, the dimensional accuracy in the longitudinal direction is more easily ensured.

As shown in FIG. 9A, the first reinforcement film 210A and the second reinforcement film 230A are divided into multiple pieces in the same way as the light-shielding wall 220A, in the longitudinal direction intersecting the optical axis direction of the optical-axis holes 222 in the light-shielding wall 220. In Modification 2, the first reinforcement film 210A and the second reinforcement film 230A are each divided into three and have the same shape.

The divided first reinforcement film 210A and second reinforcement film 230A are transparent resin films having a thickness of less than 0.5 mm or transparent glass plates having a thickness of less than 0.1 mm.

The thus-divided pieces of the light-shielding wall 220A are joined together at division surfaces 220Aa, and, as shown in FIG. 9B, the first reinforcement film 210A and the second reinforcement film 230A are bonded, from above and below, to a surface 221Aa and a back surface 221Ab of the light-shielding wall 220A, facing each other, so as to sandwich the light-shielding wall 220A. This makes it easy to dispose the light-shielding wall 220A on the first lens array 240 and increases the strength of the divided pieces of the light-shielding wall 220A, thus suppressing deformation in the longitudinal direction intersecting the optical axis direction.

Modification 3

FIG. 10A is an exploded perspective view of a light-shielding wall 220A to which a first reinforcement film 210B and a second reinforcement film 230B according to Modification 3 are bonded, and FIG. 10B shows the light-shielding wall 220A to which the first reinforcement film 210B and the second reinforcement film 230B are bonded.

As shown in FIG. 10A, the light-shielding wall 220A according to Modification 3 is divided into multiple pieces in the longitudinal direction. The pieces are joined together at division surfaces 220Aa and are disposed on the first lens array 240.

As shown in FIG. 10A, the first reinforcement film 210B and the second reinforcement film 230B are divided into multiple pieces so as to straddle the division surfaces 220Aa of the light-shielding wall 220A in the longitudinal direction intersecting the optical axis direction of the optical-axis holes 222 in the light-shielding wall 220A. In Modification 3, the first reinforcement film 210B and the second reinforcement film 230B are divided into three pieces and have the same shape.

The divided first reinforcement film 210B and second reinforcement film 230B are transparent resin films having a thickness of less than 0.5 mm or transparent glass plates having a thickness of less than 0.1 mm.

As shown in FIG. 10B, the thus-divided pieces of the light-shielding wall 220A are joined together at the division surfaces 220Aa, and the first reinforcement film 210B and the second reinforcement film 230B are bonded, from above and below, to the surface 221Aa and the back surface 221Ab, facing each other, so as to sandwich the light-shielding wall 220A and so as to straddle the division surfaces 220Aa of the light-shielding wall 220A. This configuration makes it easy to dispose the light-shielding wall 220A on the first lens array 240 and improves the joining strength of the division surfaces 220Aa of the divided light-shielding wall 220A.

FIGS. 11A and 11B show an aspect in which a first reinforcement film 210C and a second reinforcement film 230C are divided into two pieces and are bonded, from above and below, to the surface 221Aa and the back surface 221Ab, facing each other, so as to sandwich the light-shielding wall 220A and so as to straddle the division surfaces 220Aa of the divided light-shielding wall 220A.

In the case where the first reinforcement film 210C and the second reinforcement film 230C are divided into two large pieces so as to straddle division surfaces 220Aa of the light-shielding wall 220A, the pieces of the light-shielding wall 220A can be joined together on the second reinforcement film 230C, which is divided into large pieces. Thus, the light-shielding wall 220A can be more easily disposed on the first lens array 240.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An optical device comprising:
a lens body having a plurality of lenses arranged such that optical axes thereof are parallel to one another;
a light-shielding wall that is disposed for the lens body and blocks, in an optical axis direction, a portion of light directed to the plurality of lenses; and
a sheet member that covers a surface of the light-shielding wall, the surface being perpendicular to the optical axes, and allows light to pass therethrough,
wherein the light-shielding wall is thicker than the sheet member.

2. The optical device according to claim 1, wherein the sheet member is divided into multiple pieces in a longitudinal direction of the light-shielding wall intersecting the optical axis direction and is bonded to the light-shielding wall.

3. The optical device according to claim 2, wherein the sheet member is a transparent glass plate having a thickness of less than 0.1 mm.

4. The optical device according to claim 2, wherein
the light-shielding wall is divided into multiple pieces in the longitudinal direction, and the pieces are joined together at a division surface and disposed on the lens body, and
the sheet member is bonded to one surface of each piece of the light-shielding wall.

5. The optical device according to claim 4, wherein the sheet member is a transparent resin film having a thickness of less than 0.5 mm.

6. The optical device according to claim 4, wherein the sheet member is a transparent glass plate having a thickness of less than 0.1 mm.

7. The optical device according to claim 2, wherein
the light-shielding wall is divided into multiple pieces in the longitudinal direction, and the pieces are joined together at a division surface and disposed on the lens body, and
the sheet member is bonded to the light-shielding wall so as to straddle the division surface.

8. The optical device according to claim 7, wherein the sheet member is a transparent resin film having a thickness of less than 0.5 mm.

9. The optical device according to claim 7, wherein the sheet member is a transparent glass plate having a thickness of less than 0.1 mm.

10. The optical device according to claim 2, wherein the sheet member is a transparent resin film having a thickness of less than 0.5 mm.

11. The optical device according to claim 1, wherein the sheet member and the light-shielding wall are configured as a single component.

12. The optical device according to claim 11, wherein the sheet member is a transparent resin film having a thickness of less than 0.5 mm.

13. The optical device according to claim 1, wherein the sheet member is bonded to each of opposing surfaces of the light-shielding wall so as to sandwich the light shielding wall.

14. The optical device according to claim 13, wherein the sheet member is a transparent resin film having a thickness of less than 0.5 mm.

15. The optical device according to claim 1, wherein the sheet member extends over an entire light-shielding wall in the longitudinal direction intersecting the optical axis direction and is bonded to the surface.

16. The optical device according to claim 15, wherein the sheet member is a transparent resin film having a thickness of less than 0.5 mm.

17. The optical device according to claim 1, wherein the sheet member is a transparent resin film having a thickness of less than 0.5 mm.

18. The optical device according to claim 1, wherein the sheet member is a transparent glass plate having a thickness of less than 0.1 mm.

19. An image reading device comprising:
an illuminating part that radiates light onto an original document;
the optical device according to claim 1;
a light-receiving part that receives light passing through the optical device; and
a moving part that integrally moves the illuminating part, the optical device, and the light-receiving part in a direction perpendicular to the optical axis direction and the longitudinal direction.

20. An image forming apparatus comprising:
the image reading device according to claim 19, which reads an image on an original document; and
an image recording part that records the image read by the image reading device on a recording medium.

* * * * *